(12) United States Patent
Hrusch

(10) Patent No.: US 6,308,916 B1
(45) Date of Patent: *Oct. 30, 2001

(54) DUAL MODE POSITIONER FOR AN AIRCRAFT LANDING GEAR AXLE BEAM

(75) Inventor: Louis C. Hrusch, Chesterlanld, OH (US)

(73) Assignee: The B. F. Goodrich Company, Charlotte, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,359

(22) Filed: Mar. 19, 1998

(51) Int. Cl.[7] ................................................. B64C 25/10
(52) U.S. Cl. ............................................................ 244/102
(58) Field of Search ............................ 244/100 R, 102 R, 244/102 A, 102 SL, 102 SS, 104 FP; 267/113, 118, 186; 280/43.23, 766.1, 767

(56) References Cited

U.S. PATENT DOCUMENTS

| | | | |
|---|---|---|---|
| 2,392,892 | 1/1946 | Ward | 244/102 |
| 2,732,152 * | 1/1956 | Neilson et al. | 244/104 FP |
| 2,896,884 * | 7/1959 | Perdue | 244/102 R |
| 3,054,582 | 9/1962 | Lucien | 244/104 |
| 5,110,068 | 5/1992 | Grande et al. | 244/102 SL |
| 5,219,152 * | 6/1993 | Derrien et al. | 280/43.23 |
| 5,349,894 * | 9/1994 | Greer | 91/43 |
| 5,460,340 * | 10/1995 | White | 244/102 A |

FOREIGN PATENT DOCUMENTS

| | | |
|---|---|---|
| 0 295 174 A1 | 12/1988 | (EP) . |
| 0 705 758 A1 | 10/1996 | (EP) . |
| 1510554 | 5/1978 | (GB) . |
| WO 96/17770 | 6/1996 | (WO) . |
| WO 99/47416 | 3/1999 | (WO) . |

OTHER PUBLICATIONS

Disclosure A. Prior Art Positioner Without Extension During Retract, with attachment showing Fig. 1 and Fig. 2.
Disclosure B. Prior Art Positioner With Extension During Retract, with attachment showing Fig. 1 and Fig. 2.

* cited by examiner

Primary Examiner—J. Woodrow Eldred
(74) Attorney, Agent, or Firm—Brinks Hofer Gilson & Lione

(57) ABSTRACT

The invention is in the field of hydraulic actuating devices for positioning aircraft landing gear components, and more particularly relates to a dual mode positioner for an aircraft landing gear axle beam. The dual mode positioner serves to position an aircraft axle beam relative to an aircraft strut dependent alternatively for taxi and retraction into the aircraft, and also provides a predetermined amount of damping of the axle beam during taxi.

9 Claims, 2 Drawing Sheets

DUAL MODE POSITIONER FOR AN AIRCRAFT LANDING GEAR AXLE BEAM

BACKGROUND

The invention is in the field of hydraulic actuation mechanisms for positioning aircraft landing gear components, and more particularly relates to a dual mode positioner for an aircraft landing gear axle beam.

Hydraulic systems are commonly used in the aircraft landing gear art for positioning landing gear components and for providing dynamically damped movement of such components. In certain prior art landing gear, hydraulic control systems and actuation means are used to control the position of various aircraft landing gear components to alternatively configure the landing gear for extension out of the aircraft prior to landing and taxi or for retraction into the aircraft during flight. Such systems and actuating devices have been used to position an aircraft landing gear axle beam. In certain other prior art landing gear, positioners are used to maintain the position of the axle beam relative to the landing gear shock strut during taxi. The positioner includes a dynamic damping device that damps incremental rotational motion of the axle beam relative the shock strut during aircraft taxi as may be induced by runway roughness.

Weight and complexity are desirably minimized in aircraft while maintaining the level of functionality needed to meet particular design constraints. Certain aircraft landing gears need both an actuating device and a positioner. Therefore, it is an object of this invention to provide both the actuating and positioning functions with minimum weight and complexity.

SUMMARY

According to an aspect of the invention, a dual mode positioner is provided comprising an actuating device that positions an aircraft axle beam relative to an aircraft strut alternatively for taxi or retraction into the aircraft, and also provides a predetermined amount of damping of the axle beam during taxi.

According to a further aspect of the invention, a dual mode positioner is provided filled with hydraulic fluid for positioning an aircraft landing gear axle beam, the axle beam being pivotally attached to a shock strut configured for attachment to an aircraft in a manner that permits retraction, the aircraft having a hydraulic system with a high pressure supply and a low pressure return, comprising:

a first hydraulic line;

a second hydraulic line;

a hydraulic actuating device connected to the first and second hydraulic lines and having a first end configured for pivotal attachment to the shock strut and a second end configured for pivotal attachment to the axle beam, the hydraulic actuating device being responsive to hydraulic pressure in the first and second hydraulic lines such that it has a contracted mode that places the axle beam in a first angular position relative to the shock strut suitable for taxi and an extended mode that places the axle beam in a second angular position relative to the shock strut suitable for retraction, the hydraulic actuating device being incrementally extendable and contractible with a predetermined amount of damping while the hydraulic actuating device is in the contracted mode to provide damped pivotal movement of the axle beam relative to the shock strut during aircraft taxi; and, a control valve connected to the first and second hydraulic lines and having a taxi configuration wherein the second hydraulic line is in fluid communication with the high pressure supply and the first hydraulic line is in fluid communication with the low pressure return thereby placing the hydraulic actuating device in the contracted mode, and a retract configuration wherein the first hydraulic line is in fluid communication with the high pressure supply and the second hydraulic line is in fluid communication with the low pressure return thereby placing the hydraulic actuating device in the extended mode.

According to a further aspect of the invention, a method of positioning the angular orientation of an aircraft axle beam connected to a shock strut is provided, comprising the steps of changing an angular orientation of an aircraft axle beam connected to an aircraft shock strut alternatively for taxi or retraction into the aircraft with a hydraulic actuating device, and providing a predetermined. amount of damping of incremental rotational movement of the axle beam relative to the shock strut during taxi using the hydraulic actuating device.

DETAILED DESCRIPTION

Figure 1:
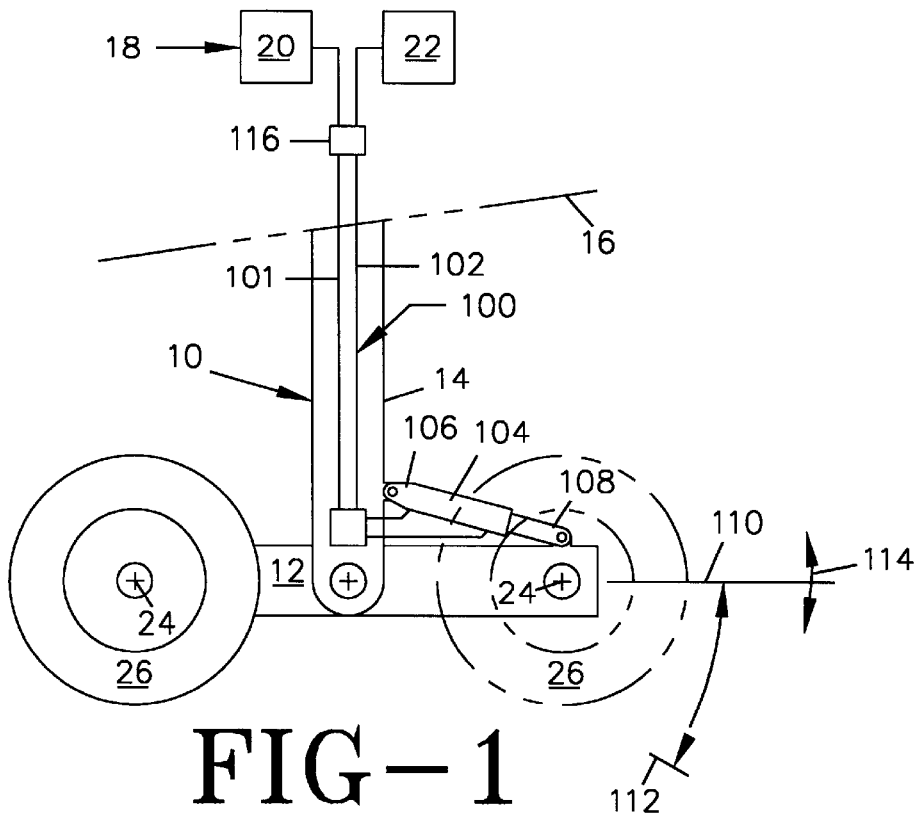
FIG. 1 presents a side view of an aircraft landing gear having a dual mode positioner according to an aspect of the invention.
Figure 2:
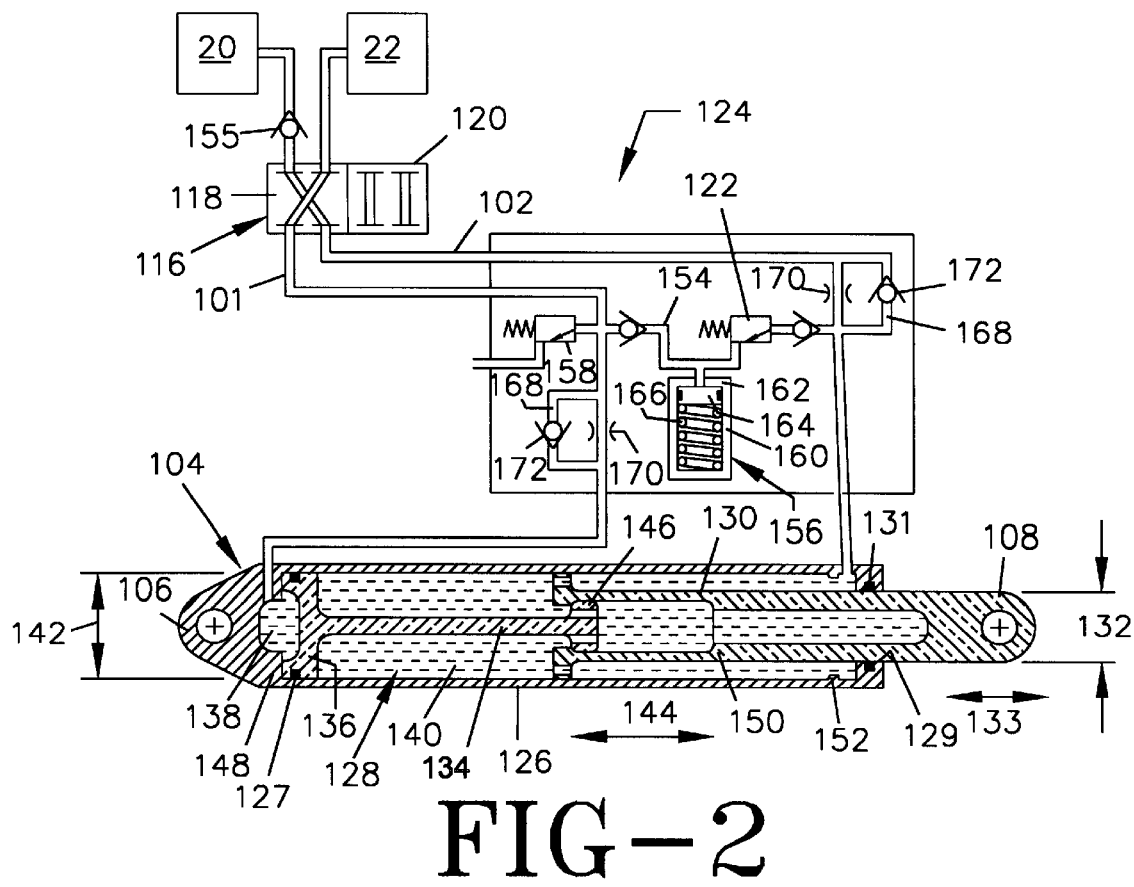
FIG. 2 presents a detailed view of the dual mode positioner of FIG. 1 comprised of a schematic view of a hydraulic control circuit and a cross-sectional side view of a hydraulic actuating device in a contracted mode, according to further aspects of the invention.
Figure 3:
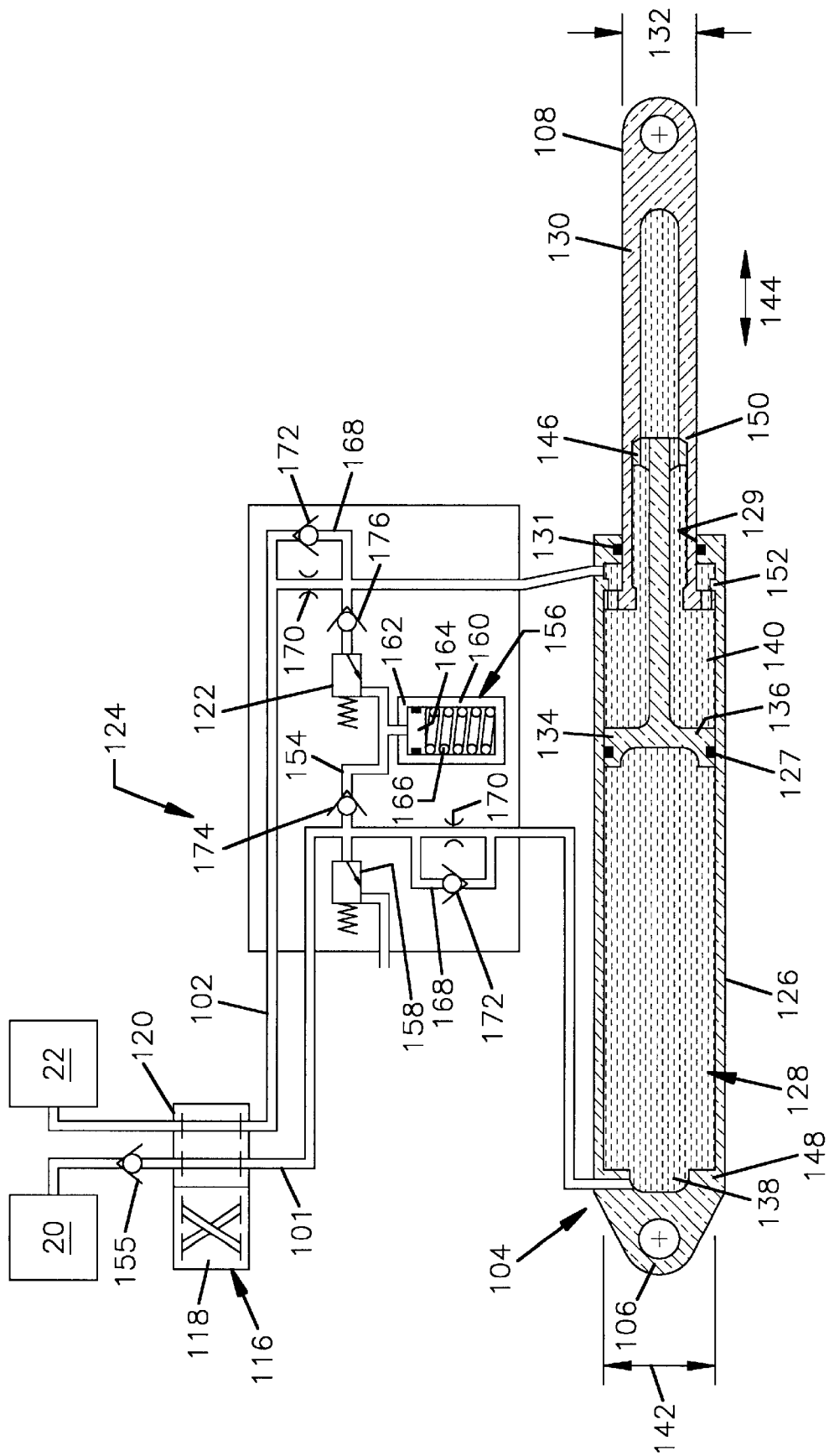
FIG. 3 presents a detailed view of the dual mode positioner of FIG. 1 comprised of a schematic view of a hydraulic control circuit and a cross-sectional side view of a hydraulic actuating device in an extended mode, according to further aspects of the invention.

Various aspects of the invention are presented in FIGS. 1–3 wherein like components are numbered alike, and which are not drawn to scale. Referring now to FIGS. 1–3, and particularly FIG. 1, a landing gear 10 is presented having a shock strut 14 and an axle beam 12, the axle beam being pivotally attached to a shock strut 14. The shock strut 14 is configured for attachment to an aircraft 16 (in phantom) in a manner that permits retraction of the landing gear 10 fully or partially into the aircraft. The axle beam is provided with axles 24, and multiple wheel/brake/tire assemblies 26 (one in phantom) are mounted on the axles 24. A dual mode positioner 100 according to an aspect of the invention for positioning the axle beam 12 is shown as employed on the landing gear 10. The aircraft 16 has a hydraulic system 18 with a high pressure supply 20 and a low pressure return 22, and the dual mode positioner 100 is filled with hydraulic fluid. The dual mode positioner 100 comprises a first hydraulic line 101 and a second hydraulic line 102, and a hydraulic actuating device 104 connected to the first and second hydraulic lines 101 and 102. The hydraulic actuating device has a first end 106 configured for pivotal attachment to the shock strut and a second end 108 configured for pivotal attachment to the axle beam 12. The hydraulic actuating device 104 is responsive to hydraulic pressure in the first and second hydraulic lines 101 and 102 such that it has a contracted mode (as presented in FIGS. 1 and 2) that places the axle beam 12 in a first angular position 110 relative to the shock strut 14 suitable for taxi, and an extended mode (as presented in FIG. 3) that places the axle beam 12 in a second angular position 112 relative to the shock strut suitable for retraction into the aircraft 16. The hydraulic actuating device 104 is incrementally extendable and contractible, as indicated by the arrow 133, with a predetermined amount of damping while the hydraulic actuating device 104 is in the contracted mode to provide damped pivotal movement of the axle beam 12 relative to the shock strut 14 during aircraft taxi, as indicated by a pair of arrows 114.

The dual mode positioner 100 also comprises a control valve 116 that is connected to the first and second hydraulic lines 101 and 102 and has a taxi configuration 118 wherein the second hydraulic line 102 is in fluid communication with the high pressure supply 20 and the first hydraulic line 101 is in fluid communication with the low pressure return 22 thereby placing the hydraulic actuating device 104 in the contracted mode (as presented in FIGS. 1 and 2). The control valve 116 also has a retract configuration 120 wherein said first hydraulic line 101 is in fluid communication with the high pressure supply 20 and the second hydraulic line 102 is in fluid communication with the low pressure return 22 thereby placing the hydraulic actuating device 104 in the extended mode (as presented in FIG. 3).

In a certain preferred embodiment, the dual mode positioner 100 also comprises a hydraulic damper device 122. The hydraulic damper device 122, the first hydraulic line 101, the second hydraulic line 102, the hydraulic actuating device 104, and the control valve 116 forming a hydraulic circuit 124 wherein said hydraulic damper device 122 provides a predetermined amount of damping while said hydraulic actuating device 104 is in the contracted mode to provide damped pivotal movement of the axle beam 12 relative to the shock strut during aircraft taxi. The hydraulic damper device 122 is preferably external to the hydraulic actuating device 104. Alternatively, the damper device 122 may be inside the hydraulic actuating device 104.

The hydraulic circuit 124 presented in FIG. 2 presents a further aspect of the invention, by way of example, and it is not intended to limit the invention to the specific embodiment presented as variations and modifications are apparent to those skilled in the art in light of the description provided herein. In a certain embodiment, the hydraulic actuating device 104 comprises a housing 126 that defines a cavity 128 with an aperture 129 at one end. The other end of the housing 126 is the first end 106 configured for pivotal attachment to the shock strut 14. A basic piston 130 is received within the cavity 128 protruding through the aperture 129. The forward end of the basic piston 130 is the second end 108 configured for pivotal attachment to the axle beam 12. The basic piston 130 is sealed against the housing 126 using a suitable seal 131 and defines a first hydraulic area 132. A floating piston 134 is disposed inside the cavity 128 and having one end 136 sealed against said housing 126 using a suitable seal 127 thereby dividing said cavity 128 into a first sub-cavity 138 and a second sub-cavity 140 and defining a second hydraulic area 142 therebetween greater than the first hydraulic area 132. The first sub-cavity 138 is in fluid communication with the first hydraulic supply line 101 and said second sub-cavity 140 is in fluid communication with the second hydraulic supply line 102. The floating piston 134 and the basic piston 130 are translatable in a common direction 144 relative to the housing 126 and relative to each other.

When the control valve 116 is in the taxi configuration 118, the second hydraulic line 102 is in fluid communication with the high pressure supply 20 and the first hydraulic line 101 is in fluid communication with the low pressure return 22 thereby applying a greater pressure to the second sub-cavity 140 than said first sub-cavity 138. This contracts the hydraulic actuating device 104 (as shown in FIG. 2) by forcing the basic piston 130 away from the floating piston 134 into engagement with a forward portion 146 of the floating piston 134, and by forcing said floating piston 134 away from the aperture 129 into engagement with a rearward portion 148 of said housing 126, said basic piston 130 being incrementally translatable, as indicated by arrow 133, into and out of said aperture 129 relative to the housing 126 while in the taxi configuration. When the control valve 116 is in the retract configuration 120 the first hydraulic line 101 is in fluid communication with the high pressure supply 20 and the second hydraulic line 102 is in fluid communication with the low pressure return 22 thereby applying a greater pressure to the first sub-cavity 138 than the second sub-cavity 140. This extends the hydraulic actuating device 114 (as shown in FIG. 3) by forcing the floating piston 134 toward the basic piston 130 into engagement with a rearward portion 150 of the basic piston 130 and by forcing said basic piston 130 out the aperture 129 into engagement with a forward portion 152 of the housing 126.

The control circuit 124 also comprises a hydraulic shunt line 154 in fluid communication with the first hydraulic supply line 101 and the second hydraulic supply line 102 wherein incremental translation 133 of the basic piston 130 both into and out of the aperture 129 while in the taxi configuration 118 causes flow of hydraulic fluid through the shunt line 154. The hydraulic damper device 122 is disposed in the hydraulic shunt line 154 and is configured to provide a predetermined amount of damping during the incremental translation 133 while in the taxi configuration 118. This is enabled by a one-way valve 155 between the high pressure supply 20 and the control valve 116 that permits flow of hydraulic fluid only into the control valve 116 (blocks flow in the reverse direction). The hydraulic damping device 122 presented in hydraulic circuit 124 is a pressure relief valve set to open at a predetermined relief pressure, but the hydraulic circuit 124 could employ other devices that generate a drop in hydraulic pressure through the shunt line 154, such as an orifice, depending on the particular damping characters desired.

According to preferred embodiment, the hydraulic circuit 124 comprises an accumulator 156 and an overpressure dump valve 158 in fluid communication with the first hydraulic line 101 closely proximate the shunt line 154. The accumulator 156 is configured to receive hydraulic fluid from the shunt line 154 at pressure greater than said hydraulic supply 20. The accumulator 156 functions as a hydraulic capacitor that receives hydraulic from the shunt line 154 in order to prevent too great a pressure from developing in the shunt line 154 during rapid incremental translations 133 of the basic piston 130. The overpressure dump valve 158 serves as further pressure limiter in the proximity of the shunt line 154, and in the embodiment presented is a pressure relief valve. The accumulator 156, the shunt line 154, and the overpressure dump valve 158 are preferably proximate the hydraulic actuating device 104 to maximize responsiveness. The position of these components relative to the actuating device 104 depends upon the particular application, and may be varied as desired.

The accumulator 156 has a capacity in fluid communication with the shunt line 154. In the embodiment of hydraulic circuit 124 presented, the accumulator comprises a pressure vessel 160 that defines an accumulator piston stop 162, an accumulator piston 164 is received within said pressure vessel 160 and sealed thereto in a manner that permits translation of the accumulator piston 164 within said pressure vessel 160. A spring 166 urges the accumulator piston 164 against the accumulator piston stop 162 whereby the accumulator piston 164 is responsive to pressure in the shunt line 154. The accumulator piston 164 is urged against the accumulator piston stop 162 until pressure in the shunt line 154 exceeds a predetermined shunt line pressure, the accumulator piston 164 being urged away from the accumulator piston stop 162 when pressure in the shunt line 154 exceeds the predetermined pressure thereby increasing the capacity. Variations in the accumulator configuration are possible and apparent in light of the description provided herein. Still referring to hydraulic circuit 124, additional shunts 168 and/or and dynamic damping devices 170 and/or flow control devices 172, including pressure relief valves, orifices, and one way valves may be employed to obtain a desired response of the hydraulic actuating device 104. A one-way flow control valve 174 is provided to prevent high pressure fluid from bypassing the actuating device 104 when in the retract configuration 120 by flowing through the shunt 154. Another one-way flow control valve 176 is provided to prevent higher pressure fluid in the accumulator 156 developed during incremental translations 133 of the basic piston 130 while in the taxi configuration 118 from feeding back into the second hydraulic supply line 102, the second hydraulic supply line 102 experiencing rapid pressure variations during the incremental stroking.

According to a further aspect of the invention, a method of positioning the angular orientation of an aircraft axle beam 12 connected to a shock strut 14 is provided, comprising the steps of changing an angular orientation 112 of an aircraft axle beam 12 connected to an aircraft shock strut 14 alternatively for taxi or retraction into the aircraft 16 with a hydraulic actuating device 104, and providing a predetermined amount of damping of incremental rotational movement 114 of the axle beam relative to the shock strut 14 during taxi using the hydraulic actuating device 104. The method of according to the invention further may further comprise the step of providing the predetermined amount of damping by shunting flow of hydraulic fluid across the first and second hydraulic lines 101 and 102. According to a preferred embodiment, the hydraulic actuating device 104 is responsive to hydraulic pressure in the first and second hydraulic lines 101 and 102, and further comprises the step of providing the predetermined amount of damping by shunting flow of hydraulic fluid across the first and second hydraulic lines 101 and 102 external to the hydraulic actuating device 104, preferably through a hydraulic shunt line 154.

The terms "rearward" and "forward" are employed to describe relative position only, and are not intended to restrict the invention to any particular orientation. Although described with reference to specific embodiments, including the best embodiments, variations are evident to those skilled in the art in light of the description provided herein, and it is intended to include any such variations within the scope of the invention as defined by the following claims.

I claim:

1. A dual mode positioner filled with hydraulic fluid for positioning an aircraft landing gear axle beam, the axle beam being pivotally attached to a shock strut configured for attachment to an aircraft in a manner that permits retraction, the aircraft having a hydraulic system with a high pressure supply and a low pressure return, comprising:

(a) a first hydraulic line;

(b) a second hydraulic line;

(c) a hydraulic actuating device comprising, a housing that defines a cavity with an aperture at one end and a first end configured for pivotal attachment to the shock strut, a basic piston received within said cavity protruding through said aperture and having a second end configured for pivotal attachment to the axle beam, said basic piston being sealed against said housing and defining a first hydraulic area, and, a floating piston disposed inside said cavity and having one end sealed against said housing thereby dividing said cavity into a first sub-cavity and a second sub-cavity and defining a second hydraulic area therebetween greater than said first hydraulic area, said first sub-cavity being in fluid communication with said first hydraulic line and said second sub-cavity being in fluid communication with said second hydraulic line, said floating piston and said basic piston being translatable in a common direction relative to said housing and relative to each other;

(d) a control valve connected to said first and second hydraulic lines and having a taxi configuration wherein said second hydraulic line is in fluid communication with the high pressure supply and said first hydraulic line is in fluid communication with the low pressure return thereby applying a greater pressure to said second sub-cavity than said first sub-cavity which contracts said hydraulic actuating device by forcing said basic piston away from said floating piston into engagement with a forward portion of said floating piston, and by forcing said floating piston away from said aperture into engagement with a rearward portion of said housing, said basic piston being incrementally translatable into and out of said aperture relative to said housing while in said taxi configuration, and a retract configuration wherein said first hydraulic line is in fluid communication with said high pressure supply and said second hydraulic line is in fluid communication with said low pressure return thereby applying a greater pressure to said first sub-cavity than said second sub-cavity which extends said hydraulic actuating device by forcing said floating piston toward said basic piston into engagement with a rearward portion of said basic piston and by forcing said basic piston out said aperture into engagement with a forward portion of said housing;

(e) a hydraulic shunt line in fluid communication with said first hydraulic line and said second hydraulic line wherein incremental translation of said basic piston both into and out of said aperture while in said taxi configuration causes flow of hydraulic fluid through said shunt line;

(f) a hydraulic damper device disposed in said hydraulic shunt line configured to provide a predetermined amount of damping during said incremental translation while in said taxi configuration, wherein said hydraulic damping device is a pressure relief valve; and, (g) a one way valve between said high pressure supply and control valve that permits flow of hydraulic fluid only into said control valve.

2. A dual mode positioner filled with hydraulic fluid for positioning an aircraft landing gear axle beam, the axle beam being pivotally attached to a shock strut configured for attachment to an aircraft in a manner that permits retraction, the aircraft having a hydraulic system with a high pressure supply and a low pressure retum, comprising:

(a) a first hydraulic line;
(b) a second hydraulic line;
(c) a hydraulic actuating device comprising,
   a housing that defines a cavity with an aperture at one end and a first end configured for pivotal attachment to the shock strut,
   a basic piston received within said cavity protruding through said aperture and having a second end configured for pivotal attachment to the axle beam, said basic piston being sealed against said housing and defining a first hydraulic area, and,
   a floating piston disposed inside said cavity and having one end sealed against said housing thereby dividing said cavity into a first sub-cavity and a second sub-cavity and defining a second hydraulic area therebetween greater than said first hydraulic area, said first sub-cavity being in fluid communication with said first hydraulic line and said second sub-cavity being in fluid communication with said second hydraulic line, said floating piston and said basic piston being translatable in a common direction relative to said housing and relative to each other;
(d) a control valve connected to said first and second hydraulic lines and having a taxi configuration wherein said second hydraulic line is in fluid communication with the high pressure supply and said first hydraulic line is in fluid communication with the low pressure return thereby applying a greater pressure to said second sub-cavity than said first sub-cavity which contracts said hydraulic actuating device by forcing said basic piston away from said floating piston into engagement with a forward portion of said floating piston, and by forcing said floating piston away from said aperture into engagement with a rearward portion of said housing, said basic piston being incrementally translatable into and out of said aperture relative to said housing while in said taxi configuration, and
   a retract configuration wherein said first hydraulic line is in fluid communication with said high pressure supply and said second hydraulic line is in fluid communication with said low pressure return thereby applying a greater pressure to said first sub-cavity than said second sub-cavity which extends said hydraulic actuating device by forcing said floating piston toward said basic piston into engagement with a rearward portion of said basic piston and by forcing said basic piston out said aperture into engagement with a forward portion of said housing;
(e) a hydraulic shunt line in fluid communication with said first hydraulic line and said second hydraulic line wherein incremental translation of said basic piston both into and out of said aperture while in said taxi configuration causes flow of hydraulic fluid through said shunt line;
(f) a hydraulic damper device disposed in said hydraulic shunt line configured to provide a predetermined amount of damping during said incremental translation while in said taxi configuration, wherein said hydraulic damping device is an orifice; and,
(g) a one way valve between said high pressure supply and control valve that permits flow of hydraulic fluid only into said control valve.

3. A dual mode positioner filled with hydraulic fluid for positioning an aircraft landing gear axle beam, the axle beam being pivotally attached to a shock strut configured for attachment to an aircraft in a manner that permits retraction, the aircraft having a hydraulic system with a high pressure supply and a low pressure return, comprising:
(a) a first hydraulic line;
(b) a second hydraulic line;
(c) a hydraulic actuating device comprising,
   a housing that defines a cavity with an aperture at one end and a first end configured for pivotal attachment to the shock strut,
   a basic piston received within said cavity protruding through said aperture and having a second end configured for pivotal attachment to the axle beam, said basic piston being sealed against said housing and defining a first hydraulic area, and,
   a floating piston disposed inside said cavity and having one end sealed against said housing thereby dividing said cavity into a first sub-cavity and a second sub-cavity and defining a second hydraulic area therebetween greater than said first hydraulic area, said first sub-cavity being in fluid communication with said first hydraulic line and said second sub-cavity being in fluid communication with said second hydraulic line, said floating piston and said basic piston being translatable in a common direction relative to said housing and relative to each other;
(d) a control valve connected to said first and second hydraulic lines and having a taxi configuration wherein said second hydraulic line is in fluid communication with the high pressure supply and said first hydraulic line is in fluid communication with the low pressure return thereby applying a greater pressure to said second sub-cavity than said first sub-cavity which contracts said hydraulic actuating device by forcing said basic piston away from said floating piston into engagement with a forward portion of said floating piston, and by forcing said floating piston away from said aperture into engagement with a rearward portion of said housing, said basic piston being incrementally translatable into and out of said aperture relative to said housing while in said taxi configuration, and
   a retract configuration wherein said first hydraulic line is in fluid communication with said high pressure supply and said second hydraulic line is in fluid communication with said low pressure return thereby applying a greater pressure to said first sub-cavity than said second sub-cavity which extends said hydraulic actuating device by forcing said floating piston toward said basic piston into engagement with a rearward portion of said basic piston and by forcing said basic piston out said aperture into engagement with a forward portion of said housing;
(e) a hydraulic shunt line in fluid communication with said first hydraulic line and said second hydraulic line wherein incremental translation of said basic piston both into and out of said aperture while in said taxi configuration causes flow of hydraulic fluid through said shunt line
(f) a hydraulic damper device disposed in said hydraulic shunt line configured to provide a predetermined amount of damping during said incremental translation while in said taxi configuration;
(g) a one way valve between said high pressure supply and control valve that permits flow of hydraulic fluid only into said control valve; and
(h) an accumulator configured to receive hydraulic fluid from said shunt line at pressure greater than said high pressure supply.

4. A dual mode positioner filled with hydraulic fluid for positioning an aircraft landing gear axle beam, the axle beam being pivotally attached to a shock strut configured for attachment to an aircraft in a manner that permits retraction, the aircraft having a hydraulic system with a high pressure supply and a low pressure return, comprising:

(a) a first hydraulic line;

(b) a second hydraulic line;

(c) a hydraulic actuating device comprising,
   a housing that defines a cavity with an aperture at one end and a first end configured for pivotal attachment to the shock strut,
   a basic piston received within said cavity protruding through said aperture and having a second end configured for pivotal attachment to the axle beam, said basic piston being sealed against said housing and defining a first hydraulic area, and,
   a floating piston disposed inside said cavity and having one end sealed against said housing thereby dividing said cavity into a first sub-cavity and a second sub-cavity and defining a second hydraulic area therebetween greater than said first hydraulic area, said first sub-cavity being in fluid communication with said first hydraulic line and said second sub-cavity being in fluid communication with said second hydraulic line, said floating piston and said basic piston being translatable in a common direction relative to said housing and relative to each other;

(d) a control valve connected to said first and second hydraulic lines and having a taxi configuration wherein said second hydraulic line is in fluid communication with the high pressure supply and said first hydraulic line is in fluid communication with the low pressure return thereby applying a greater pressure to said second sub-cavity than said first sub-cavity which contracts said hydraulic actuating device by forcing said basic piston away from said floating piston into engagement with a forward portion of said floating piston, and by forcing said floating piston away from said aperture into engagement with a rearward portion of said housing, said basic piston being incrementally translatable into and out of said aperture relative to said housing while in said taxi configuration, and
   a retract configuration wherein said first hydraulic line is in fluid communication with said high pressure supply and said second hydraulic line is in fluid communication with said low pressure return thereby applying a greater pressure to said first sub-cavity than said second sub-cavity which extends said hydraulic actuating device by forcing said floating piston toward said basic piston into engagement with a rearward portion of said basic piston and by forcing said basic piston out said aperture into engagement with a forward portion of said housing;

(e) a hydraulic shunt line in fluid communication with said first hydraulic line and said second hydraulic line wherein incremental translation of said basic piston both into and out of said aperture while in said taxi configuration causes flow of hydraulic fluid through said shunt line;

(f) a hydraulic damper device disposed in said hydraulic shunt line configured to provide a predetermined amount of damping during said incremental translation while in said taxi configuration;

(g) a one way valve between said high pressure supply and control valve that permits flow of hydraulic fluid only into said control valve; and (h) an accumulator having a capacity in fluid communication with said shunt line, said accumulator comprising a pressure vessel that defines an accumulator piston stop, an accumulator piston received within said pressure vessel and sealed thereto in a manner that permits translation of said accumulator piston within said pressure vessel, and a spring urging said accumulator piston against said accumulator piston stop whereby said accumulator piston is responsive to pressure in said shunt line and said accumulator piston is urged against said accumulator piston stop until pressure in said shunt line exceeds a predetermined shunt line pressure, said accumulator piston being urged away from said accumulator piston stop when pressure in said shunt line exceeds said predetermined pressure thereby increasing said capacity.

5. A dual mode positioner filled with hydraulic fluid for positioning an aircraft landing gear axle beam, the axle beam being pivotally attached to a shock strut configured for attachment to an aircraft in a manner that permits retraction, the aircraft having a hydraulic system with a high pressure supply and a low pressure return, comprising:

(a) a first hydraulic line;

(b) a second hydraulic line;

(c) a hydraulic actuating device comprising,
   a housing that defines a cavity with an aperture at one end and a first end configured for pivotal attachment to the shock strut,
   a basic piston received within said cavity protruding through said aperture and having a second end configured for pivotal attachment to the axle beam, said basic piston being sealed against said housing and defining a first hydraulic area, and,
   a floating piston disposed inside said cavity and having one end sealed against said housing thereby dividing said cavity into a first sub-cavity and a second sub-cavity and defining a second hydraulic area therebetween greater than said first hydraulic area, said first sub-cavity being in fluid communication with said first hydraulic line and said second sub-cavity being in fluid communication with said second hydraulic line, said floating piston and said basic piston being translatable in a common direction relative to said housing and relative to each other;

(d) a control valve connected to said first and second hydraulic lines and having a taxi configuration wherein said second hydraulic line is in fluid communication with the high pressure supply and said first hydraulic line is in fluid communication with the low pressure return thereby applying a greater pressure to said second sub-cavity than said first sub-cavity which contracts said hydraulic actuating device by forcing said basic piston away from said floating piston into engagement with a forward portion of said floating piston, and by forcing said floating piston away from said aperture into engagement with a rearward portion of said housing, said basic piston being incrementally translatable into and out of said aperture relative to said housing while in said taxi configuration, and
   a retract configuration wherein said first hydraulic line is in fluid communication with said high pressure supply and said second hydraulic line is in fluid communication with said low pressure return thereby applying a greater pressure to said first sub-cavity than said second sub-cavity which extends said hydraulic actuating device by forcing said floating piston toward said basic piston into engagement with a rearward portion of said basic piston and by forcing said basic piston out said aperture into engagement with a forward portion of said housing;

(e) a hydraulic shunt line in fluid communication with said first hydraulic line and said second hydraulic line wherein incremental translation of said basic piston both into and out of said aperture while in said taxi configuration causes flow of hydraulic fluid through said shunt line;

(f) a hydraulic damper device disposed in said hydraulic shunt line configured to provide a predetermined amount of damping during said incremental translation while in said taxi configuration;

(g) a one way valve between said high pressure supply and control valve that permits flow of hydraulic fluid only into said control valve; and, (h) an accumulator configured to receive hydraulic fluid from said shunt line at pressure greater than said high pressure supply, said accumulator and said shunt line being proximate said hydraulic actuating device.

6. A dual mode positioner filled with hydraulic fluid for positioning an aircraft landing gear axle beam, the axle beam being pivotally attached to a shock strut configured for attachment to an aircraft in a manner that permits retraction, the aircraft having a hydraulic system with a high pressure supply and a low pressure return, comprising:

(a) a first hydraulic line;

(b) a second hydraulic line;

(c) a hydraulic actuating device comprising,
  a housing that defines a cavity with an aperture at one end and a first end configured for pivotal attachment to the shock strut,
  a basic piston received within said cavity protruding through said aperture and having a second end configured for pivotal attachment to the axle beam, said basic piston being sealed against said housing and defining a first hydraulic area, and,
  a floating piston disposed inside said cavity and having one end sealed against said housing thereby dividing said cavity into a first sub-cavity and a second sub-cavity and defining a second hydraulic area therebetween greater than said first hydraulic area, said first sub-cavity being in fluid communication with said first hydraulic line and said second sub-cavity being in fluid communication with said second hydraulic line, said floating piston and said basic piston being translatable in a common direction relative to said housing and relative to each other;

(d) a control valve connected to said first and second hydraulic lines and having a taxi configuration wherein said second hydraulic line is in fluid communication with the high pressure supply and said first hydraulic line is in fluid communication with the low pressure return thereby applying a greater pressure to said second sub-cavity than said first sub-cavity which contracts said hydraulic actuating device by forcing said basic piston away from said floating piston into engagement with a forward portion of said floating piston, and by forcing said floating piston away from said aperture into engagement with a rearward portion of said housing, said basic piston being incrementally translatable into and out of said aperture relative to said housing while in said taxi configuration, and a retract configuration wherein said first hydraulic line is in fluid communication with said high pressure supply and said second hydraulic line is in fluid communication with said low pressure return thereby applying a greater pressure to said first sub-cavity than said second sub-cavity which extends said hydraulic actuating device by forcing said floating piston toward said basic piston into engagement with a rearward portion of said basic piston and by forcing said basic piston out said aperture into engagement with a forward portion of said housing;

(e) a hydraulic shunt line in fluid communication with said first hydraulic line and said second hydraulic line wherein incremental translation of said basic piston both into and out of said aperture while in said taxi configuration causes flow of hydraulic fluid through said shunt line;

(f) a hydraulic damper device disposed in said hydraulic shunt line configured to provide a predetermined amount of damping during said incremental translation while in said taxi configuration;

(g) a one way valve between said high pressure supply and control valve that permits flow of hydraulic fluid only into said control valve; and (h) an accumulator.

7. The device of claim 6, wherein said accumulator is configured to receive hydraulic fluid from said shunt line at a pressure greater than said high pressure, said accumulator and said shunt line being proximate said hydraulic actuating device; and, an overpressure relief valve in fluid communication with said first hydraulic line closely proximate said shunt line.

8. The device of claim 6, wherein said accumulator is configured to receive hydraulic fluid from said shunt line at pressure greater than said hydraulic supply.

9. The device of claim 6, wherein an accumulator having a capacity in fluid communication with said shunt line, said accumulator comprising a pressure vessel that defines an accumulator piston stop, an accumulator piston received within said pressure vessel and sealed thereto in a manner that permits translation of said accumulator piston within said pressure vessel, and a spring urging said accumulator piston against said accumulator piston stop whereby said accumulator piston is responsive to pressure in said shunt line and said accumulator piston is urged against said accumulator piston stop until pressure in said shunt line exceeds a predetermined shunt line pressure, said accumulator piston being urged away from said accumulator piston stop when pressure in said shunt line exceeds said predetermined pressure thereby increasing said capacity.

* * * * *